United States Patent
Asang

(10) Patent No.: US 11,242,005 B2
(45) Date of Patent: Feb. 8, 2022

(54) HOLDING DEVICE FOR HOLDING A VEHICLE COMPONENT ON A PANE SURFACE OF A MOTOR VEHICLE

(71) Applicant: Bayerische Motoren Werke Aktiengesellschaft, Munich (DE)

(72) Inventor: Peter Asang, Eurasburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 82 days.

(21) Appl. No.: 16/824,100

(22) Filed: Mar. 19, 2020

(65) Prior Publication Data

US 2020/0215979 A1    Jul. 9, 2020

Related U.S. Application Data

(63) Continuation of application No. PCT/EP2018/072771, filed on Aug. 23, 2018.

(30) Foreign Application Priority Data

Sep. 20, 2017   (DE) ...................... 10 2017 216 637.1

(51) Int. Cl.
*B60R 1/04* (2006.01)
*B60R 11/00* (2006.01)

(52) U.S. Cl.
CPC ................ *B60R 1/04* (2013.01); *B60R 11/00* (2013.01); *B60R 2011/0026* (2013.01); *B60R 2011/0089* (2013.01)

(58) Field of Classification Search
CPC ... B60R 1/04; B60R 11/00; B60R 2011/0026; B60R 2011/0089; Y10S 248/90; F16M 13/02
See application file for complete search history.

(56) References Cited

U.S. PATENT DOCUMENTS

| 3,367,616 | A | * | 2/1968 | Bausch | ...................... B60R 1/04 248/483 |
| 3,436,049 | A | * | 4/1969 | De Claire | ................. B60R 1/04 248/479 |

(Continued)

FOREIGN PATENT DOCUMENTS

| DE | 602 15 102 T2 | 1/2007 |
| DE | 10 2012 218 126 A1 | 4/2013 |
| WO | WO 2013/037393 A1 | 3/2013 |

OTHER PUBLICATIONS

International Search Report (PCT/ISA/210) issued in PCT Application No. PCT/EP2018/072771 dated Dec. 7, 2018 with English translation (six (6) pages).

(Continued)

*Primary Examiner* — Brian D Nash
(74) *Attorney, Agent, or Firm* — Crowell & Moring LLP

(57) ABSTRACT

A holding device holds a vehicle component such as an internal rear view mirror on a pane surface of a motor vehicle. The holding device includes a base element having a fastening surface for attachment to the pane surface of the motor vehicle, a cover part for fastening to the base element and for holding a foot element, wherein the cover part is held on the base element by engaging at least one pin in an associated recess in a holding element of the cover part. The holding element has an auxiliary recess which is arranged offset to the recess in a direction of extension such that when force is applied in the direction of extension with an amount of force which is greater than a threshold amount, the cover part shifts on the base part and the at least one pin is at least partially accommodated in the auxiliary recess.

11 Claims, 3 Drawing Sheets

(56) References Cited

U.S. PATENT DOCUMENTS

| | | | | |
|---|---|---|---|---|
| 3,554,582 | A | | 1/1971 | Yamashita et al. |
| 3,589,662 | A | * | 6/1971 | Lagrange .................. B60R 1/04 248/549 |
| 3,703,270 | A | * | 11/1972 | Tomlin ..................... B60R 1/04 248/549 |
| 4,254,931 | A | | 3/1981 | Aikens et al. |
| 4,524,941 | A | * | 6/1985 | Wood ........................ B60R 1/04 248/222.11 |
| 4,872,630 | A | * | 10/1989 | Cooper .................. B60R 11/00 248/278.1 |
| 4,909,470 | A | * | 3/1990 | Clark ........................ B60R 1/04 248/479 |
| 5,058,851 | A | * | 10/1991 | Lawlor ..................... B60R 1/04 248/549 |
| 5,151,828 | A | * | 9/1992 | Sugimura .................. B60R 1/04 248/222.13 |
| 5,377,948 | A | * | 1/1995 | Suman ...................... B60R 1/04 248/549 |
| 5,377,949 | A | * | 1/1995 | Haan ......................... B60R 1/04 248/483 |
| 5,820,097 | A | | 10/1998 | Spooner |
| 7,784,953 | B2 | * | 8/2010 | Rumsey ..................... B60R 1/04 359/880 |
| 11,040,663 | B2 | * | 6/2021 | DeMaagd ................. F16B 1/00 |
| 2003/0112536 | A1 | | 6/2003 | Wachi |
| 2004/0079853 | A1 | | 4/2004 | Suzuki et al. |
| 2013/0088792 | A1 | | 4/2013 | Jones et al. |
| 2015/0251605 | A1 | * | 9/2015 | Uken .................... H04N 5/2253 248/467 |
| 2015/0367786 | A1 | * | 12/2015 | Chen ....................... B60R 11/02 224/482 |
| 2016/0009230 | A1 | | 1/2016 | Miyado et al. |
| 2016/0167594 | A1 | * | 6/2016 | Yaghoubi ............. B64D 11/064 297/163 |
| 2017/0174146 | A1 | * | 6/2017 | Kipp .................... B60N 2/2222 |
| 2017/0214260 | A1 | | 7/2017 | Kim |
| 2017/0240120 | A1 | * | 8/2017 | Krug ....................... B60R 11/04 |
| 2018/0126914 | A1 | * | 5/2018 | Ferreri ................... A45B 25/00 |
| 2018/0337464 | A1 | * | 11/2018 | Minikey, Jr. ............ H01R 12/75 |
| 2020/0391660 | A1 | * | 12/2020 | Sugimura ................. B60R 1/12 |

OTHER PUBLICATIONS

German-language Written Opinion (PCT/ISA/237) issued in PCT Application No. PCT/EP2018/072771 dated Dec. 7, 2018 (five (5) pages).

German-language Search Report issued in German Application No. 10 2017 216 637.1 dated Apr. 20, 2018 with partial English translation (17 pages).

* cited by examiner

HOLDING DEVICE FOR HOLDING A VEHICLE COMPONENT ON A PANE SURFACE OF A MOTOR VEHICLE

CROSS REFERENCE TO RELATED APPLICATIONS

This application is a continuation of PCT International Application No. PCT/EP2018/072771, filed Aug. 23, 2018, which claims priority under 35 U.S.C. § 119 from German Patent Application No. 10 2017 216 637.1, filed Sep. 20, 2017, the entire disclosures of which are herein expressly incorporated by reference.

BACKGROUND AND SUMMARY OF THE INVENTION

The invention relates to vehicle components, in particular rear view mirrors, of motor vehicles, in particular holding devices for holding vehicle components on pane surfaces of motor vehicles.

Interior rear view mirrors in motor vehicles are conventionally fastened directly to an inner surface of the windshield. For this purpose, a base element is attached, in particular by adhesive bonding, to the windshield, wherein the base element has structures in order to form a form-fitting connection with a mirror foot. As a result, a mirror device which is attached pivotably to the mirror foot can be held securely on the windshield.

Diverse fastening devices between the foot plate and the mirror foot are known. For example, document DE 602 15 102 B2 shows an interior mirror device in which a base is attached to an inner surface of a windshield and which base has a T shape such that a spring element with a pair of flexible sections, which are adjoined by inwardly shaped hook sections, engages behind the T-shaped structure of the base in order to hold a strut, which is designed for holding the mirror assembly, on the windshield via the base.

Document DE 10 2012 218 126 A1 shows a holder for a rear view mirror with a base which is attached to a windshield by adhesive bonding and has dovetail-shaped walls. The mirror holder has dovetail-shaped engagement side walls which slide on the dovetail-shaped walls of the base. With the aid of a locking lever which is attached pivotably to the mirror holder and which has a cam surface which is pivotable on the surface of the base for contact purposes, the mirror holder can be locked on the base against a displacement movement.

More recent requirements of holding devices for interior rear view mirrors or similar vehicle components to be fastened to the windshield provided that, in the event of an impact, the holding device permits a short translatory movement of the rear view mirror or of the vehicle component in the longitudinal direction of the motor vehicle before the movement is blocked or the holding device released. The order of magnitude of such a translatory movement is preferably between a few millimeters to a few centimeters. The previously known holding devices for rear view mirrors in motor vehicles do not provide such a possibility of a translatory compensating movement in the event of an action of force.

It is therefore the object of the present invention to provide a holding device for a motor vehicle component to be fastened to a pane surface, the holding device permitting simple installation and, in the event of an action of force in the longitudinal direction of the motor vehicle, permits an in particular limited translatory movement of the vehicle component.

This and other objects are achieved by the holding device for holding a vehicle component on a pane surface of a motor vehicle and by an arrangement for fastening to a pane surface of a motor vehicle, according to the claimed invention.

According to a first aspect, a holding device for holding a vehicle component on a pane surface of a motor vehicle, in particular for holding an interior rear view mirror, comprises:

a base element with a fastening surface for attaching to the pane surface of the motor vehicle;

a cover part for fastening to the base element and for holding a foot element, wherein the cover part is held on the base element by at least one pin engaging in an associated recess in a holding element of the cover part, and wherein the holding element has an auxiliary recess which is arranged next to the recess in a direction of extent such that, when force acts in the direction of extent with an amount of force which is greater than a threshold amount, the cover part is displaced on the base part and the at least one pin is at least partially accommodated in the auxiliary recess.

The above holding device provides a form-fitting connection between a base element and a cover part. The connection is realized by engagement of one or more pins in corresponding recesses of a holding element. The auxiliary recess which is offset in a direction of extent can provide a receiving region for the relevant pin, in the event that, because of an action of force, the cover part is displaced in the direction of extent toward the base element. It is ensured here that, despite the displacement, the cover part is held securely on the base element.

Furthermore, the at least one pin can be arranged on the base element in a manner protruding transversely with respect to a direction of extent, and wherein the cover part has the holding element with the at least one associated recess. Therefore, the cover part is held on the base element when the pin engages in the recess.

According to one embodiment, the at least one auxiliary recess and the at least one recess each can form a common L-shaped recess, wherein the auxiliary recess is dimensioned with respect to the associated pin in such a manner that the pin can move into the associated auxiliary recess only in the event of an action of force above the threshold amount.

It can alternatively or additionally be provided that the at least one auxiliary recess and the at least one recess are separated from each other by a web, wherein the web is dimensioned with respect to the associated pin in such a manner that the web breaks and the pin can move into the associated auxiliary recess only in the event of an action of force above the threshold amount.

Furthermore, the cover part can have a holding opening for receiving the foot element, wherein the foot element has at least one stud on a holding region, which is received in the at least one recess. In particular, the stud can be arranged on the holding region in such a manner that the stud is received in the at least one recess offset with respect to the corresponding pin of the base element in a direction transversely with respect to the direction of extent.

It can be provided that the cover part is arranged on the base element under tension, in that the pin is pressed onto an edge of the recess such that, for displacing the pin in the direction of extent with respect to the auxiliary recess, a force amount which exceeds the threshold amount is required because of friction.

According to a further aspect, an arrangement for fastening to a pane surface of a motor vehicle is provided with the above holding device and a vehicle component, in particular an interior mirror device.

According to a further aspect, a motor vehicle with the above arrangement is provided, wherein the fastening surface is attached, in particular adhesively bonded, to the pane surface.

In particular, the direction of extent can correspond to a longitudinal direction of the motor vehicle, and therefore the holding device with the vehicle component yields in the longitudinal direction in the event of an action of force in the forward direction of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
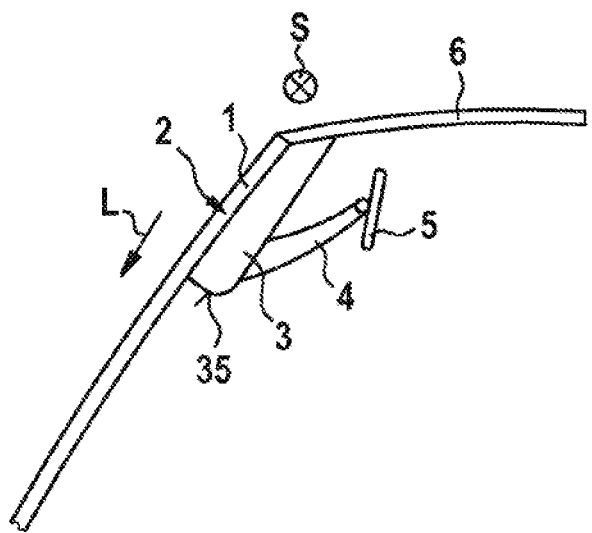
FIG. 1 is a side view of a holding device, which is attached to a windshield, for a rear view mirror.

FIG. 1 shows a side view of a holding device 2 which is mounted on a windscreen 1 of a motor vehicle and has a cover part 3 on which an adjustable mirror device 5 as an example of a windscreen-mounted vehicle component is arranged via a mirror foot 4 in order to form an interior mirror device of a motor vehicle. The cover part 3 adjoins a roof lining 6 and extends in the lateral direction along the windscreen 1 approximately in the center of the windscreen 1 and in the longitudinal direction of the motor vehicle in the direction of a lower edge of the windscreen 1.

Figure 2:
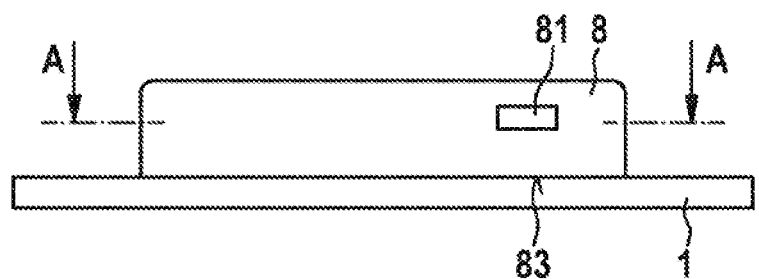
FIG. 2 is a sectional view through a base element, which is attached to the windshield, of the holding device.
Figure 3:
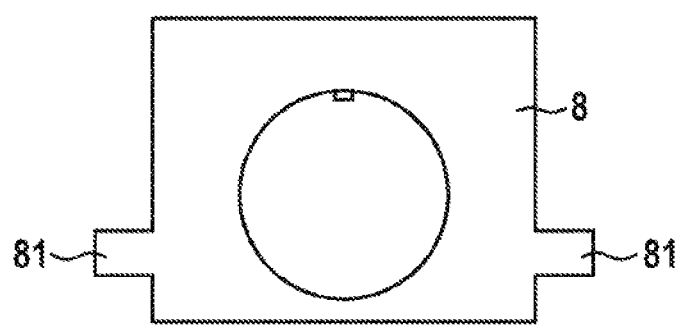
FIG. 3 is a sectional view in the surface direction through the base element of the holding device.

As is shown in the side view of FIG. 2 with the cover part 3 removed, a base element 8 for holding the foot element 4 is attached to the windscreen 1 in the region of the cover part 3 to be placed on. The base element 8 can be designed, for example, as a base plate. FIG. 3 shows a sectional view along the intersecting line A-A of FIG. 2. The base element 8 can be connected fixedly to the windshield 1 in particular by adhesive bonding of a fastening surface 83 on the inner surface of said windshield 1. The base element 8 serves to reliably hold the cover part 3 on the windshield 1. For the installation, the cover part 3 is placed onto the base element 8 and fastened thereto.

The cover part 3 is of shell-shaped design and, in the state placed onto the base element 8, completely overlaps the base element 8 and covers the latter, with the edges of the cover part 3 preferably lying against the inner surface of the windshield 1. For this purpose, the cover part 3 has an upper side 34 and side surfaces 35 which surround the latter and flatly cover the covered part of the windshield 1. The side surfaces 35 are entirely or partially arranged on the edges of the upper side 34 and protrude in the direction of the windshield 1. The base element 8 can be covered visually by the cover part 3 by being accommodated in the cover part 3.

Pins 81 which in particular protrude opposite each other and serve for holding the cover part 3 on the base element 8 are provided at the sides of the base element 8. The pins 81 are projections which can have substantially any desired cross section.

Figure 4:
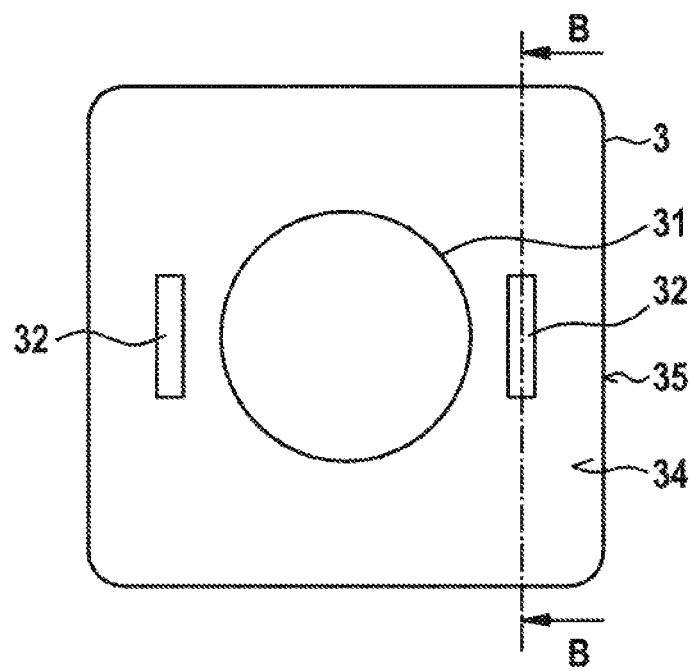
FIG. 4 is a view of the foot element from below in the non-mounted state.
Figure 5:
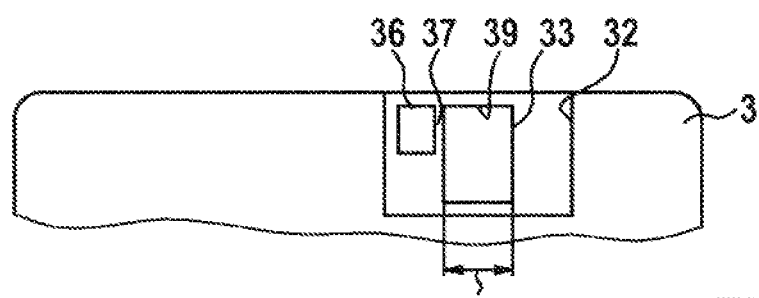
FIG. 5 is a sectional view through the foot element in the region of pockets for receiving a bolt.

FIG. 4 shows a view of the lower side of the foot element with a holding element 31 for receiving a mirror foot (not shown in FIG. 4). At the sides of the holding opening 31, holding elements 32 are provided which, as shown in the sectional view along the intersecting line B-B of FIG. 5, are fastened to the cover part 3 and each have a recess 33. The recess 33 has a substantially rectangular cross section and serves for receiving the pins 81 of the base element 8 in the mounted state. The width B of the recess 33 substantially corresponds to the width of the pins 81 to be received therein.

Figure 6:
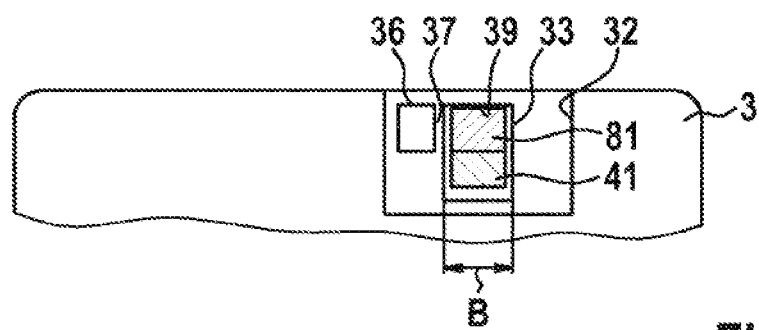
FIG. 6 is the same sectional view as in FIG. 5 with a pin received therein.
Figure 7:
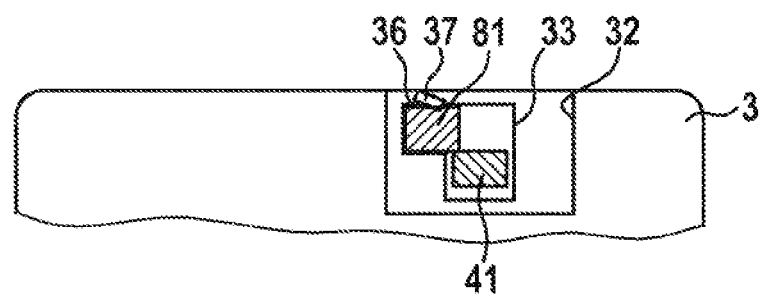
FIG. 7 is a sectional view through the holding device when the cover part is displaced in the direction of extent.

As illustrated in FIGS. 5 and 6, the holding element 32 has an extension of the recess 33 which can be designed in the form of a laterally arranged auxiliary recess 36. The auxiliary recess 36 is arranged laterally next to the recess 33 and is separated from the latter by a narrow web 37 (see FIGS. 5 and 6) or is connected to said recess such that a single approximately L-shaped recess is formed, as illustrated in FIG. 7.

In the assembled state, the pins 81 are accommodated in the associated recess 33 of the holding element 32. The extension of the recess 33 by means of the auxiliary recess 36 enables the cover part 3 to be displaced relative to the base element 8. In the event of an action of force on the cover part 3 in the longitudinal direction L, the auxiliary recess 36 enables the cover part 3 to be able to be displaced along the fastening surface 83 in a direction transversely with respect to the direction of extent of the pins 81. The pins 81 move here in the direction of the auxiliary recesses 36 and are at least partially accommodated in the respective auxiliary recess 36.

The auxiliary recess 36 can be connected to the recess 33 in such a manner that a movement of the cover part 3 on the base element 8 is permitted only as soon as the force amount of a corresponding action of force in the longitudinal direction exceeds a predetermined threshold amount.

In order to define the threshold amount which is necessary in order to permit a movement between the cover part 3 and the base element 8 in the longitudinal direction L, the strength of the web 37 arranged between the recess 33 and the auxiliary recess 36 can be dimensioned in such a manner that, when a force amount exceeding the threshold amount acts along the fastening surface 83 and transversely with respect to the direction of extent of the pins 81, the web breaks and the pin 81 moves in the direction of the auxiliary recess 36 and into the latter.

FIG. 7 shows the situation, corresponding to FIG. 6, in which the cover part 3 is displaced in relation to the base element 8 by an action of force.

Figure 8:
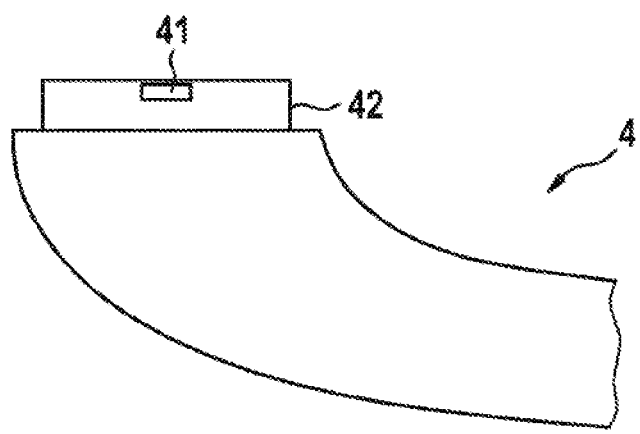
FIG. 8 is a sectional view through the foot element.

FIG. 8 shows a side view of the foot element 4 for holding the mirror device 5. The foot element is inserted with a holding part 42 integrally formed thereon into the holding opening 31 of the cover part 3 and is provided with studs 41. The studs 41 are arranged in such a manner that they engage in the respective recess 33 and the foot element 4 is thus held on the cover part 3. Both the associated pin 81 and the stud 41 are therefore accommodated and held in each of the recesses 33.

By the pins 81 being received in the recesses 33 of the holding elements 32, the cover part can be reliably held on the base element 8. In particular, the holding elements 32 on the cover part 3 and the width of the base element 8 can be designed in such a manner that, when the cover part 3 is placed onto the base element 8, the mutually facing sides of the holding elements 32 lie against lateral outer surfaces 84 of the base element 8 in order to ensure protection against rotation of the cover part 3 on the base element 8.

Figure 9:
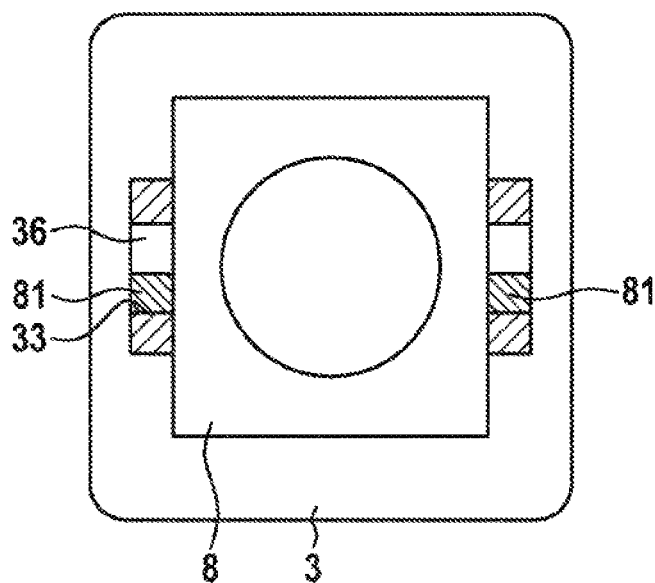
FIG. 9 is a sectional view through the cover part and the base element in a mounted state.

FIG. 9 illustrates a sectional view through the cover part 3 and the base element 8 in a locked state. It is seen that the pins 81 project into the recess 33 of the holding element 32 and are held there.

In order to ensure a fixed fit of the cover part 3 on the base element 8, when the pin 81 engages in the recess 33 that side of the pin 81 which faces the windshield 1 and that edge 39 of the recess 33 which faces the pin lie against each other with force, and therefore the cover part 3 is reliably held on the base element 8 and at the same time is pressed with the side surfaces 35 onto the windshield 1. As a result, in particular in the embodiment in which the recess 33 and the auxiliary recess 36 form a common L-shaped recess, the threshold amount of the force which is required for displacing the cover part 3 in relation to the base element 8 can be adjusted by the friction between the side of the pins 81 and the edge 39 of the recess 33.

LIST OF REFERENCE SIGNS

1 Windshield
2 Holding device
3 Cover part
31 Holding opening
32 Holding element
33 Recess
34 Upper side
35 Side surfaces
36 Auxiliary recess
37 Web
39 Edge of the recess
4 Foot element
41 Stud
42 Holding region
5 Mirror device
6 Roof lining
8 Base element
81 Pin
82 Lower end of the base element
83 Fastening surface
84 Lateral outer surface of the base element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A holding device for holding a vehicle component on a pane surface of a motor vehicle, comprising:
    a base element with a fastening surface for attaching to the pane surface of the motor vehicle;
    a cover part for fastening to the base element and for holding a foot element, wherein
        the cover part is held on the base element by a pin engaged in an associated recess in a holding element of the cover part, and wherein
        the holding element has an auxiliary recess which is arranged offset with respect to the associated recess in a direction of extent such that, when force acts on the cover part in the direction of extent with an amount greater than a threshold amount:
            the cover part is displaced on the base part, and
            the engaged pin is at least partially displaced into the auxiliary recess.

2. The holding device according to claim 1, wherein
    the pin is arranged on the base element in a manner protruding transversely with respect to the direction of extent, and
    the cover part is held on the base element when the pin engages in the associated recess of the holding element.

3. The holding device according to claim 1, wherein
    the auxiliary recess and the associated recess together form a common L-shaped recess, and
    the auxiliary recess is dimensioned with respect to the associated pin in such a manner that the pin is movable into the associated auxiliary recess only in the event of an action of force above the threshold amount.

4. The holding device according to claim 1, wherein
    the auxiliary recess and the associated recess are separated from each other by a web, and
    the web is dimensioned with respect to the associated pin in such a manner that the web breaks and the pin is movable into the associated auxiliary recess only in the event of an action of force above the threshold amount.

5. The holding device according to claim 1, wherein
    the cover part has a holding opening for receiving the foot element, and
    the foot element has a stud on a holding region, which stud is received in the associated recess.

6. The holding device according to claim 5, wherein
    the stud is arranged on the holding region in such a manner that said stud is received in the associated recess offset with respect to the corresponding pin of the base element in a direction transversely with respect to the direction of extent.

7. The holding device according to claim 1, wherein
    the cover part is arranged on the base element under tension, in that the pin is pressed onto an edge of the associated recess such that, for displacing the pin in the direction of extent with respect to the auxiliary recess, a force amount which exceeds the threshold amount is required because of friction.

8. The holding device according to claim 1, wherein
    the vehicle component is an interior rear view mirror.

9. An arrangement for fastening to a pane surface of a motor vehicle, comprising:
    a holding device according to claim 1; and
    an interior mirror device held on the holding device.

10. A motor vehicle, comprising:
    an arrangement according to claim 9; and
    a pane surface, wherein
        the fastening surface of the arrangement is attached to the pane surface.

11. The motor vehicle according to claim 10, wherein the direction of extent corresponds to a longitudinal direction of the motor vehicle.

\* \* \* \* \*